(12) United States Patent
Conrad

(10) Patent No.: US 6,193,035 B1
(45) Date of Patent: Feb. 27, 2001

(54) TROLLEY POLE SUPPORT APPARATUS WITH VARIABLE LENGTH MOMENT ARM

(75) Inventor: Larry James Conrad, Smicksburg, PA (US)

(73) Assignee: Brookville Mining Equipment Corporation, Brookville, PA (US)

(*) Notice: Subject to any disclaimer, the term of this patent is extended or adjusted under 35 U.S.C. 154(b) by 0 days.

(21) Appl. No.: 09/135,827

(22) Filed: Aug. 18, 1998

(51) Int. Cl.[7] ........................................ B60L 3/00
(52) U.S. Cl. .................. 191/64; 191/66; 191/67; 191/70; 191/68
(58) Field of Search ................. 191/64, 66, 68, 191/70, 67

(56) References Cited

U.S. PATENT DOCUMENTS

| 394,037 | 12/1888 | Van Depoele . | |
|---|---|---|---|
| 488,179 | * 12/1892 | Bentley | 191/64 |
| 539,681 | 5/1895 | Green . | |
| 568,523 | * 9/1896 | Davis | 191/66 |
| 738,305 | 9/1903 | Fayol . | |
| 928,442 | 7/1909 | Gierding . | |
| 1,036,477 | 8/1912 | Fisher . | |
| 1,045,538 | 11/1912 | Fisher . | |
| 1,444,983 | * 2/1923 | Schaake | 191/64 |
| 2,437,213 | 3/1948 | Slomer | 191/70 |
| 2,616,991 | 11/1952 | Slomer | 191/70 |
| 4,510,352 | * 4/1985 | May et al. | 191/64 |

* cited by examiner

Primary Examiner—Russell D. Stormer
Assistant Examiner—Frantz F. Jules
(74) Attorney, Agent, or Firm—Webb Ziesenheim Logsdon Orkin & Hanson, P.C.

(57) ABSTRACT

A trolley pole support apparatus is provided in which the trolley pole is urged to an extended position by a spring acting against a moment arm and the force required to position the trolley pole in the stowed position is minimized by minimizing the moment arm between the spring contact point and the trolley pole pivot. By doing so, even with the maximum compression of the spring in the stowed position, this small moment arm permits only small forces to be transmitted to the trolley pole shoe.

21 Claims, 5 Drawing Sheets

TROLLEY POLE SUPPORT APPARATUS WITH VARIABLE LENGTH MOMENT ARM

BACKGROUND OF THE INVENTION

1. Field of the Invention

The invention relates to a support apparatus for a trolley pole and, more specifically, to a design utilizing a spring and a variable length moment arm to minimize the force required to lower the trolley arm to a stowed position.

2. Description of the Related Art

A trolley pole is a device used to conduct electrical current from an overhead fixed conductor such as a trolley line to the electric drive on a rail vehicle. A U-shape electrical conducting shoe located on the end of the trolley pole contacts and captures the trolley line. An electrical cable is attached to the conducting shoe and runs down the trolley pole to the electric drive of the vehicle. A trolley pole support apparatus must maintain a suitable upward force on the trolley pole to keep the conducting shoe in constant physical and, thereby, electrical contact with the trolley line.

Two frequent problems associated with trolley poles are (1) keeping the trolley pole on the trolley line and (2) stowing the trolley pole when not in use.

Standard trolley poles pivot about an arc between an extended position and a stowed position utilizing a coil spring and mechanical linkage to provide pole tension against the trolley line. The mechanical linkage does not provide a constant force to the trolley pole shoe as the pole travels through its arc. As the pole rises the coil spring expands and therefore the force on the trolley pole shoe decreases. In instances where the trolley line is relatively high, as the trolley pole extends upward to reach the trolley line, the spring is extended to such a length that the pole force can reduce almost to the point where there is no longer any force to keep the trolley pole shoe in contact with the trolley line. Consequently, the trolley pole will lose contact with the trolley line and electrical power to the vehicle will be disrupted. On the other hand, in order to move the trolley pole to the stowed position it is necessary to rotate the trolley pole and to compress the spring which requires the application of a high force on the trolley pole when it is needed least.

Typically, the vehicle operator manually positions the trolley pole from the extended position to the stowed position. The closer the trolley pole is brought to the stowed position, the greater the force the operator must exert to keep the pole held down. The operator must therefore exert the greatest force upon the trolley pole to stow it when the pole is not in use. This is opposite the desired situation in which the force to stow the trolley pole is less than the force the trolley pole shoe exerts upon the trolley line in the extended position.

U.S. Pat. No. 488,179 teaches a trolley stand for electric cars utilizing a trolley pole socket piece F having a lateral arm acting against a spring H. The lateral arm provides a long moment arm to urge the shoe against the trolley line when the trolley pole is in the extended position, the spring is extended and provides a short moment arm when the trolley pole is in the stowed position and the spring is compressed. In this manner, the low spring force in the extended position acts upon a larger moment arm to produce a high rotational moment and subsequent high force on the shoe against the trolley line, but the high spring force in the stowed position acts upon a small moment arm to produce a low rotational moment and low force for stowing the trolley pole.

However, as illustrated in FIG. 2 of this patent, the lateral arm F' is limited in its rotation to the stowed position by the wall of cylindrical drum C. Ideally, to minimize the force of the spring against the trolley arm in the stowed position, the lateral arm F' would position the roller F immediately below the pivot $F^3$. This is impossible with the arrangement of this patent. An apparatus is needed which provides a very low moment arm to the spring force when the trolley pole is stowed.

A trolley pole support apparatus is desired in which the force required to stow the trolley pole is low even, in the stowed position, when the spring associated with the apparatus is in maximum compression.

BRIEF SUMMARY OF THE INVENTION

The invention is directed toward an apparatus for supporting on a vehicle a trolley pole pivotable between an extended position in which a shoe on an end of the trolley pole engages an overhead conductor and a retracted position in which the trolley pole is stowed comprising a base mounted upon the vehicle having a cavity therein, wherein the cavity has a bottom defined by a floor. A coil spring is supported in the floor of the cavity and a pivot support is attached to the base and has a collar. A pivoting member is attached to an end of the trolley pole opposite the shoe and pivotally connected about a pivot point in the collar of the pivot support. A link extends from the pivoting member to a contact point on the coil spring and compresses the coil spring to create a rotational force urging the trolley pole to the extended position. An imaginary column is defined by an upward projection of the cavity beyond the base and the collar of the pivot support extends into the imaginary column to minimize the distance between the pivot point and the contact point on the coil spring when the trolley pole is in the stowed position.

The invention is also directed toward a vehicle having a trolley pole support apparatus as described above.

Other objects and advantages of the present invention will become apparent and obvious from the study of the following description and accompanying drawings which are merely illustrative of such invention.

DESCRIPTION OF THE INVENTION

Figure 1:
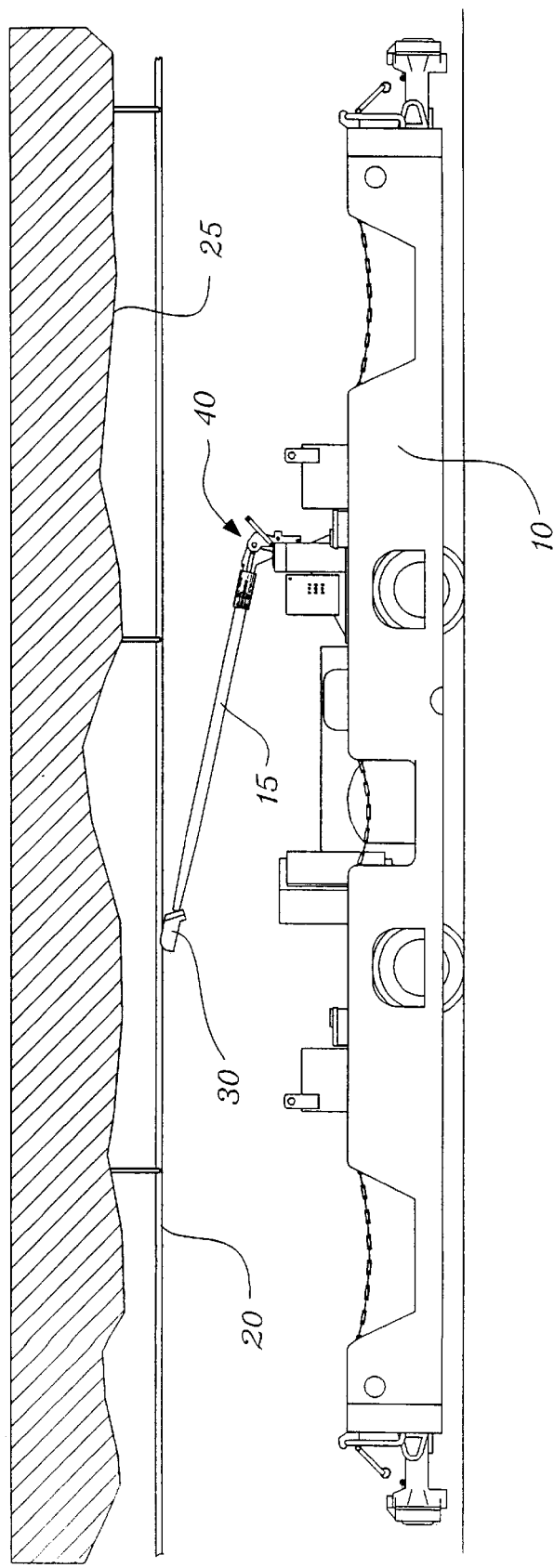
FIG. 1 illustrates a schematic of a vehicle utilizing a trolley pole support apparatus in accordance with the subject invention.

FIG. 1 illustrates a schematic showing a vehicle 10 having a trolley pole 15 used to conduct electricity from a trolley line 20 to an electrical drive (not shown) in the vehicle 10. The vehicle 10 illustrated in FIG. 1 is used, for example, in mining applications where the trolley line 20 is mounted to a ceiling 25 of a mine. However, it should be understood that the trolley pole apparatus in accordance with the subject invention is not limited to vehicles used within mines and may be used with any vehicle utilizing a trolley pole in which the trolley pole moves along an arc from an extended position to a stowed position.

The trolley pole 15 illustrated in FIG. 1 is shown in the extended position whereby a trolley pole shoe 30 is in contact with the trolley line 20. When the trolley pole 15 is not in use, it is rotated in a counterclockwise position and stowed against the vehicle 10. The trolley pole support apparatus, which is the focus of the subject invention, is indicated by reference item 40 in FIG. 1.

As previously discussed, when the force exerted by the trolley pole shoe 30 on the trolley line 20 is sufficient to maintain the shoe against the line, then the force required to retract the trolley pole to the stowed position may be high. As an example, in a typical situation the force exerted by the trolley pole shoe 30 against the trolley line 20 may be approximately 30 pounds with the trolley pole 15 in the extended position while the required force to be applied against the trolley pole shoe 30 in order to hold the trolley pole 15, at the trolley pole shoe 30, in the stowed position is about 80 pounds.

Figure 2:
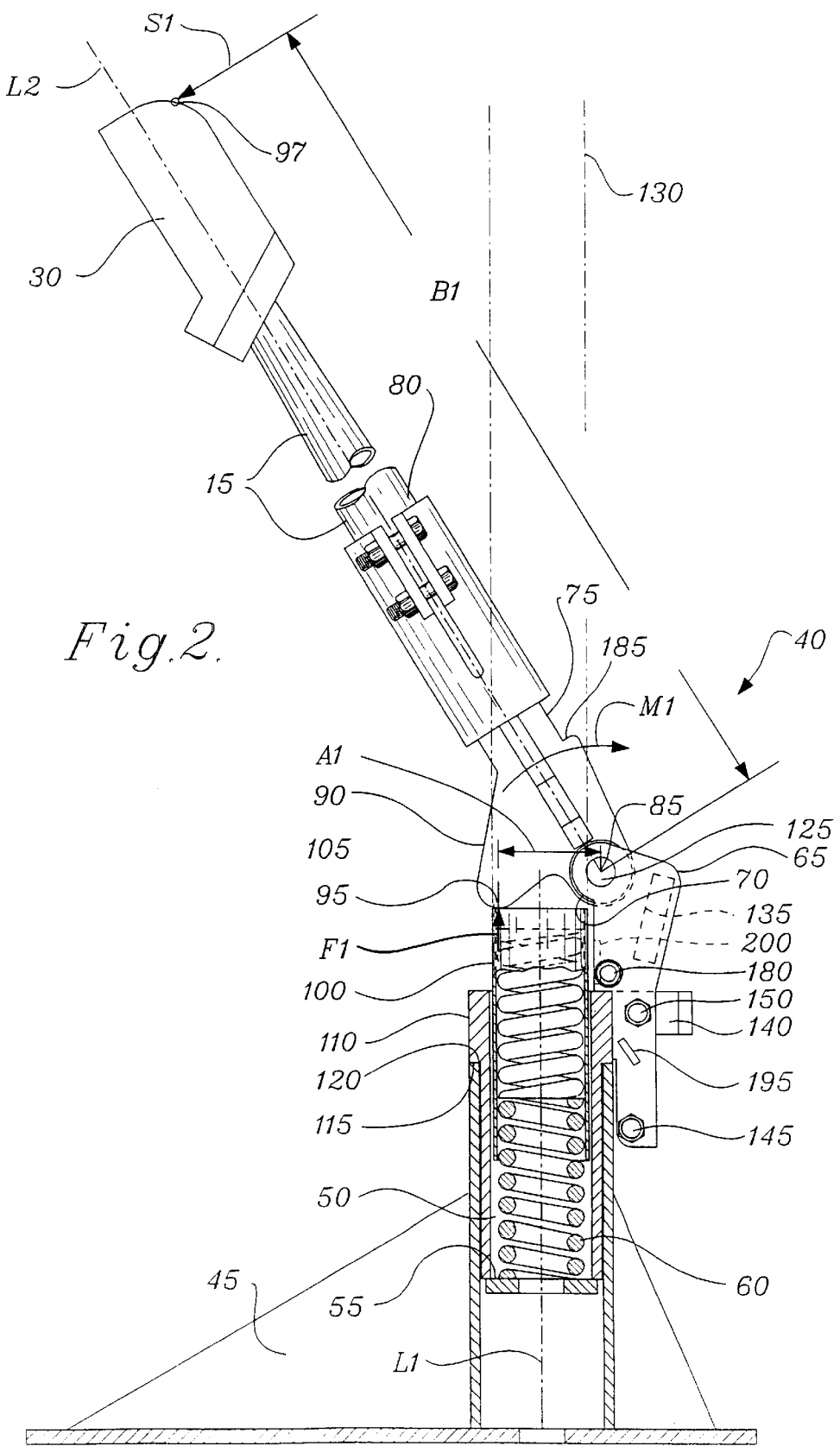
FIG. 2 illustrates a side view of a trolley pole apparatus of the subject invention in an extended position.

FIG. 2 illustrates a trolley pole support apparatus 40 in accordance with the subject invention which produces a high rotational moment when the spring is extended and the trolley pole is in the extended position, and which produces a low rotational moment when the spring force is at its greatest and the trolley pole is in the stowed position.

FIG. 2 also illustrates the trolley pole support apparatus 40 in an extended position in which the trolley pole 15 is nearly at the upper limit of the extended position. The level trolley line 20 illustrated in FIG. 1 is for illustrative purposes only and is atypical of an operating mine in which the height of the ceiling varies greatly as does the height of the trolley line 20.

The trolley pole support apparatus 40 has a base 45 mounted upon the vehicle 10. The base 45 has a cavity 50 therein which is oriented about a longitudinal axis L1 and has a bottom defined by a floor 55. A coil spring 60 rests within the cavity 50 on the floor 55. The cavity 50 may be cylindrical in shape.

A pivot support 65 is attached to the base 45 and has an integral collar 70. A pivoting member 75 is attached to an end 80 of the trolley pole 15 opposite the trolley pole shoe 30 and is pivotally connected about a pivot point 85 within the collar 70 of the pivot support 65. A link 90 extends from the pivoting member 75 to a contact point 95 at the coil spring 60 to create a rotational force about the pivot point urging the trolley pole 15 in a clockwise direction to the extended position.

A spring cup 100 having a flat upper surface 105 may extend over the coil spring 60 and into the cavity 50 to provide a flat surface upon which the link 90 may contact and along which the link 90 may slide. Furthermore, a sleeve 110 having a shoulder 115 may rest within the base 45 against an opposing shoulder 120 at the base 45 such that the sleeve 110 becomes the cavity 50 in which the coil spring 60 rests. In this situation the pivot support 65 is mounted directly to the sleeve 110 such that the sleeve 110 may rotate about longitudinal axis L1 within the base 45 thereby enabling the trolley pole 15 to rotate about the longitudinal axis L1.

The pivot point 85 may be defined by a pivot pin 125 extending through both the collar 70 and the pivoting member 75, thereby permitting the trolley pole shoe 30 to be raised and lowered along an arc whose center of curvature is defined by pivot point 85.

The rotational moment M1 imparted by the trolley pole support apparatus 40 to the trolley pole 15 is defined by the product of the force F1 exerted by the coil spring 60 and the distance A1 between the point of contact 95 and the pivot point 85 which is also referred to as the moment arm. The force S1 exerted by the rotational moment M1 upon the shoe 30 is a function of the distance B1 between the pivot point 85 and the point of contact 97 of the shoe 30 with the trolley line (not shown). Specifically, the force S1 is defined by the quotient of the rotational moment divided by the distance B1.

In FIG. 2 the trolley pole 15 is in the extended position and the point of contact 95 is on the left side of the spring cup surface 105. In this arrangement the length of the moment arm defined by distance A1 is maximized and the coil spring 60 may be selected or adjusted with spacers between the coil spring 60 and the floor 55 to provide a force F1 and a rotational moment M1 that will produce an acceptable force on the trolley shoe 30 against the trolley line 20.

It should be noted the collar 70 of the pivot support 65 extends into an imaginary column 130 defined by an upward projection of the cavity 50 beyond the base 45. While the collar 70 may provide an upper limit to the travel of the spring 60 and the spring cup 100, it will be further explained in the discussion of FIG. 3 that this feature also permits a significant reduction in the force required to move the trolley pole 15 to the stowed position.

Figure 3:
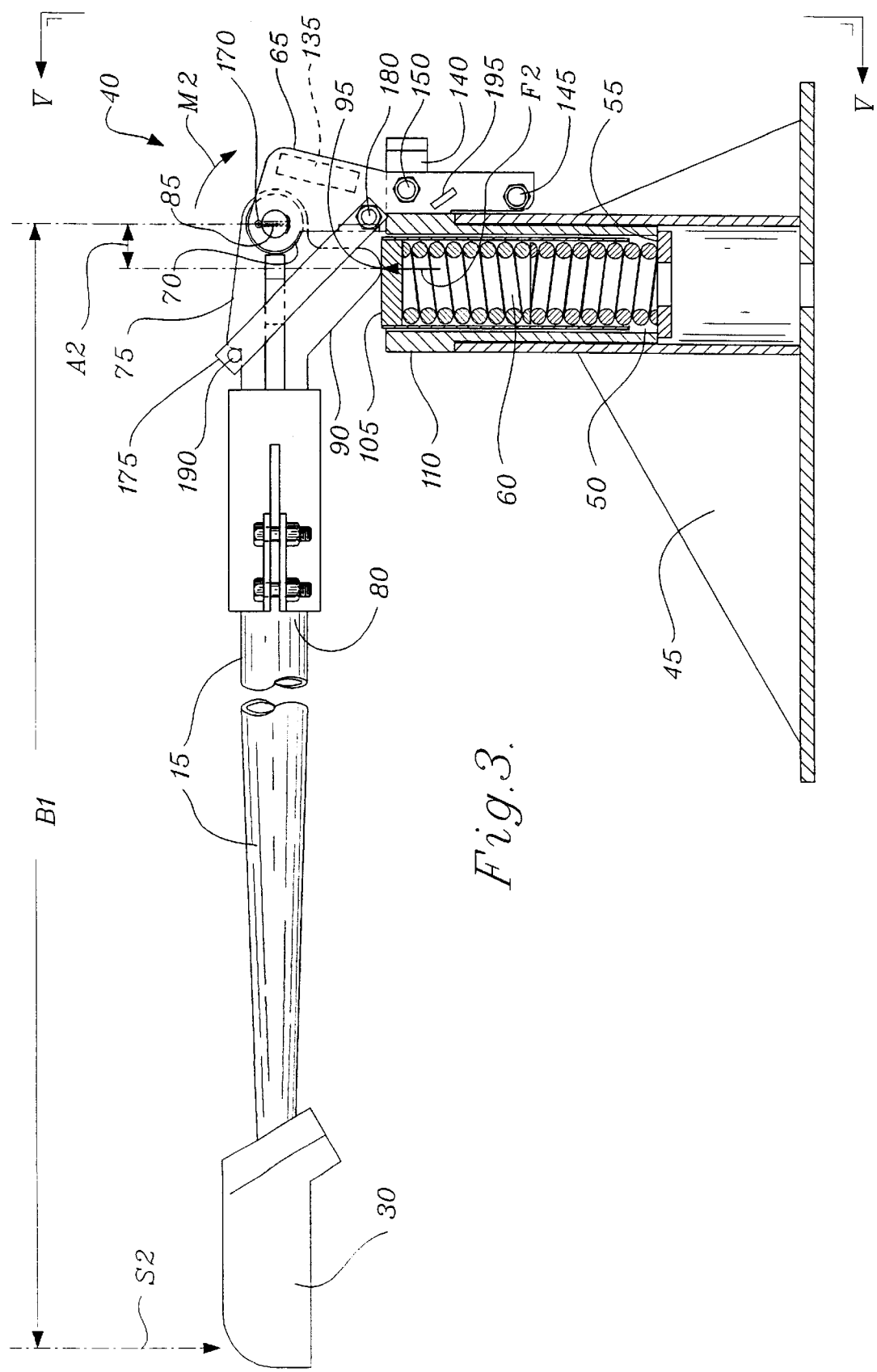
FIG. 3 illustrates a side view of the trolley pole apparatus of the subject invention in a stowed position.

FIG. 3 illustrates an identical arrangement to that shown in FIG. 2 but with the trolley pole 15 rotated counterclockwise to the stowed position. The contact point 95 of the link 90 now occurs on the right side of the spring cup flat surface 105. As the trolley pole is lowered from the extended position illustrated in FIG. 2 to the stowed position illustrated in FIG. 3, the contact point 95 moves from the left side to the right side of the flat surface 105 on the spring cup 100.

In moving from the extended position to the stowed position, the coil spring 60 is compressed and, as a result, exerts a high force F2 upon the link 90. However, the moment arm defined as the distance A2 between the contact point 95 and the pivot point 85 has been significantly reduced from the length of the moment arm defined by distance A1 in FIG. 2 such that the overall rotational moment defined by the product of F2×A2 is relatively small. Because of this, even though the spring force F2 is high, the force S2 required on the trolley pole 15 at a distance B1 from the pivot point 85 to rotate the trolley pole to the stowed position is relatively low.

A latch 175 is shown in FIG. 3 holding the trolley pole 15 in the stowed position; however, the focus of discussion for FIG. 3 is the force S2 required to move the trolley pole 15 to the stowed position, where it then may be restrained by latch 175.

As a means for comparison, the tables below illustrate the upward force exerted by the shoe 30 for different rotational positions of the trolley pole 15. The column titled "Degrees from horizontal," lists angles formed by the longitudinal axis L2 along the trolley pole 15 with an axis perpendicular to the longitudinal axis L1 associated with the cavity 50. The effective lever ratio is the ratio between the distances A1 and A2 and determines the mechanical advantage available to transmit the force at the spring to a force upon the trolley pole shoe. For a ratio of 20:1, for example, a force of 20 pounds exerted by the spring will translate into a force of 1 pound at the trolley pole shoe.

TABLE 1

TYPICAL DESIGN POLE FORCE

| Degrees from horizontal | Pounds of spring force | Effective lever ratio | Pounds of vertical force at trolley shoe |
|---|---|---|---|
| 0 degrees | 1687 | 20.8:1 | 81 |
| 20 degrees | 1225 | 20.8:1 | 59 |
| 40 degrees | 689 | 20.8:1 | 33 |

TABLE 2

DESIGN POLE FORCE OF SUBJECT INVENTION

| Degrees from horizontal | Pounds of spring force | Effective lever ratio | Pounds of vertical force at trolley shoe |
|---|---|---|---|
| 0 degrees | 1687 | 56.2:1 | 30 |
| 20 degrees | 1225 | 31.4:1 | 39 |
| 40 degrees | 689 | 20.8:1 | 33 |

While Table 2 illustrates a ratio of 56.2:1 for the stowed position of the subject invention, this ratio may be anywhere between 30:1 and 70:1. However, it is preferred to have a ratio greater than 40:1 and preferably about 56:1. Utilizing this design, the force required against the shoe to restrain the trolley pole in the stowed position may be less than the force exerted by the shoe against the trolley wire in the extended position.

The significant reduction in force to move and retain the trolley pole 15 in the stowed position is the result of the pivot point 85 being moved much closer to the spring contact point 95 in the stowed position. This is made possible by moving the collar 70 of the pivot support 65 to the left, well beyond distances relative to the force contact point 95 found in prior art designs.

As discussed with FIG. 2, the collar 70 extends into an imaginary column 130 projected from the cavity 50 of the base 45. Prior designs have maintained the position of the collar 70 outside of the imaginary column 130 for ease of maintenance of the spring 60 and associated parts. When the collar 70 is outside of the imaginary column 130, the trolley pole 15 may be rotated clockwise until the link 90 clears the imaginary column 130 and thereafter the spring 60 and spring cup 100 may be lifted directly from the cavity 50.

The trolley pole support apparatus of the subject invention provides for maintenance of the spring 60 and spring cup 100 in a different fashion.

Figure 4:
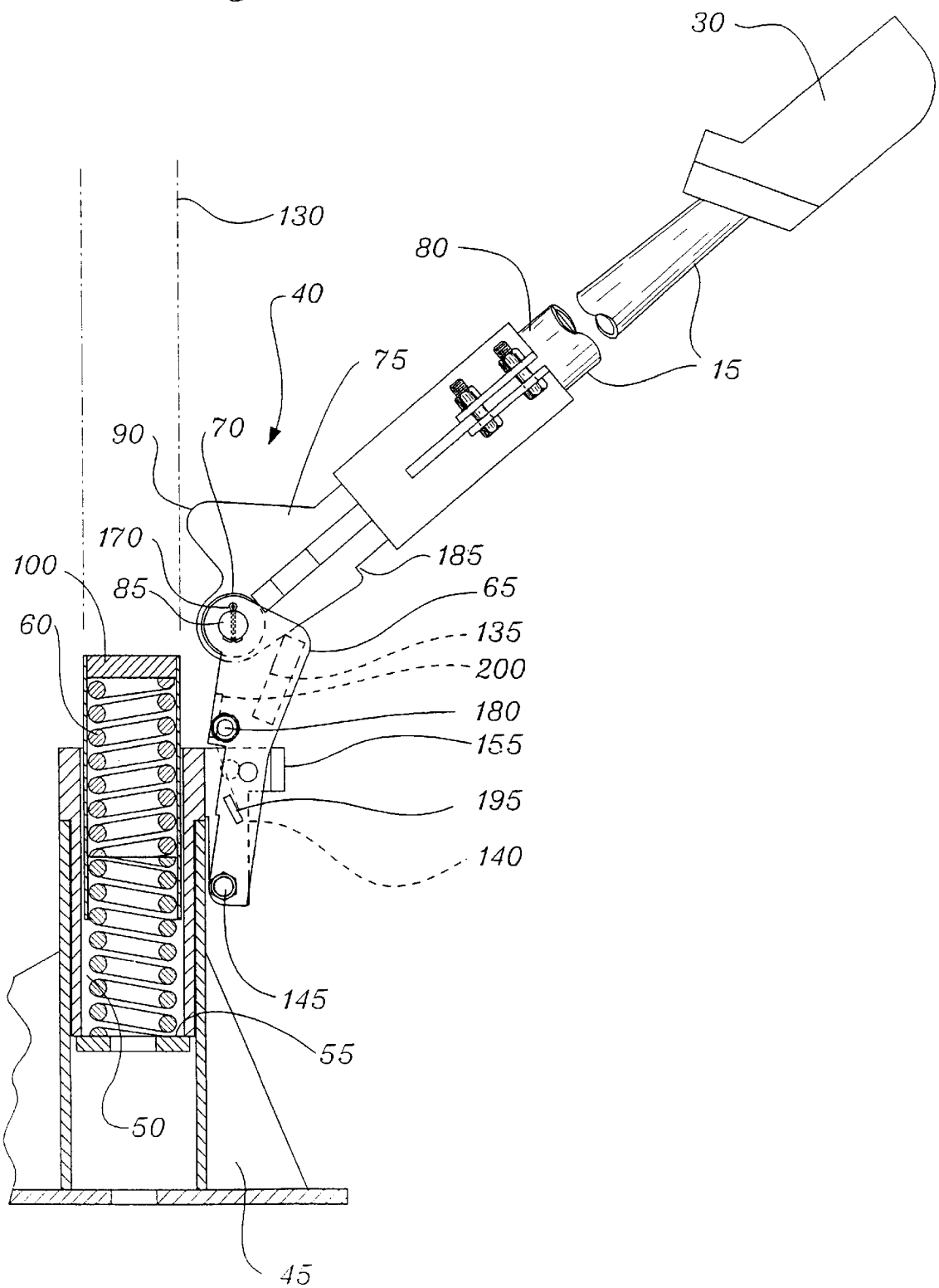
FIG. 4 illustrates a side view of the trolley pole apparatus of the subject invention in an open position for spring replacement.

FIG. 4 illustrates the trolley pole support apparatus 40 in a position for maintenance by which the trolley pole 15 is rotated in the clockwise position about pivot point 85 until the link 90 clears the imaginary column 130. A gusset 135, which attaches two opposing plates of the pivot support 65, may be used as a stop to limit rotation of the trolley pole 15.

The pivot support 65 is mounted to a mounting plate 140 in a fashion that permits the collar 70 of the pivot support 65 to be laterally displaced to the right, thereby permitting the collar 70 to clear the imaginary column 130 extending from the cavity 50 of the base 45. In this fashion the spring 60 and the spring cup 100 may easily be removed.

The pivot support 65 is restrained on the mounting plate 140 by a rotator pin 145 and a restraining pin 150 (FIG. 3). The restraining pin 150 may be removed such that the pivot support 65 is supported only by the rotator pin 145 (FIG. 4).

The pivot support 65 may then be rotated clockwise about the rotating pin 145 until the collar 70 clears the imaginary column 130. The mounting plate 140 has laterally extending ears 155 (out of the page) which may limit the clockwise rotation of the pivot support 65. In this manner, repair or replacement of the coil spring 60 or spring cup 100 may easily be accomplished by rotating the trolley pole clockwise and rotating pivot support 65 clockwise after restraining pin 150 has been removed.

Figure 5:
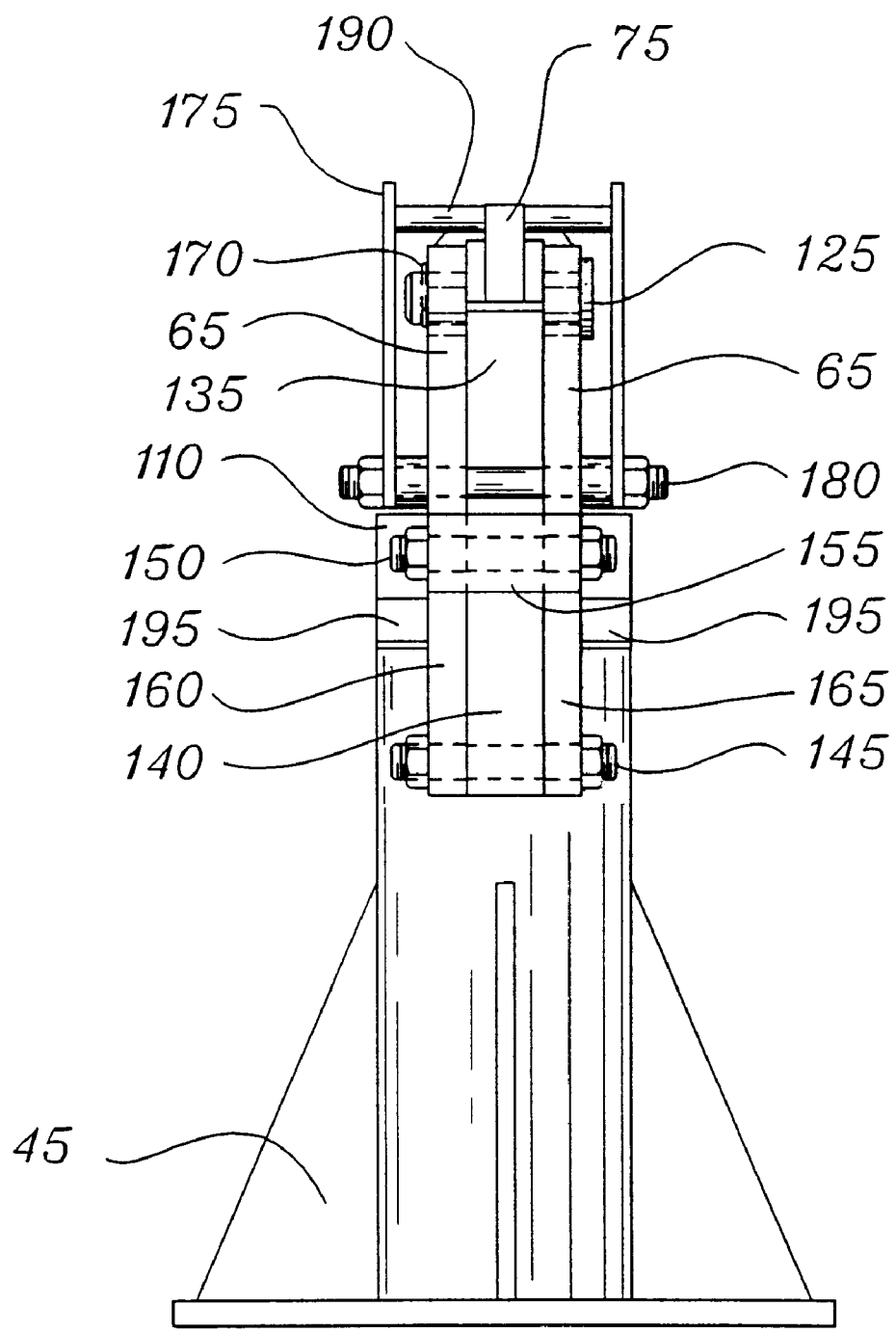
FIG. 5 illustrates a side view taken along arrows 5—5 in FIG. 2.

FIG. 5 illustrates a side view along arrows 5—5 of FIG. 2. The mounting plate 140 is secured to the sleeve 110 within the cavity of the base (not shown). The pivot support 65 may be made up of two plates 160, 165 opposing each other and secured to the mounting plate 140 by the rotator pin 145 and the restraining pin 150. The pivoting member 75 is attached to the pivot support 65 through pivot pin 125. The manner of securing the rotator pin 145, the restraining pin 150 and the pivot pin 125 within the bores they penetrate may be accomplished using any number of means known to those skilled in the art of fasteners. As an example and as illustrated in FIG. 5, one such way may be through the use of a cotter pin 170 as shown with pivot pin 125, or by the use of a nut threaded onto a bolt as illustrated with the rotator pin 145 and restraining pin 150. Furthermore, while the pivoting member 75 has been restrained from rotation by two pins, any number of other arrangements for securing the pivoting member 75 to the base 45 so it may easily be released for rotation or lateral displacement are known to those skilled in the art of fasteners.

As illustrated in FIG. 3, the trolley pole 15 may be fixed in the stowed position utilizing the latch 175 pivotally attached to the pivot support 65 at a point 180 and rotated over a notch 185 in the pivoting member 75 such that a bar 190 extending from the latch engages the notch 185 and restrains the trolley pole 15 in the stowed position.

As discussed with FIG. 5, the pivot support 65 may be made up of two plates 160 and 165. These plates are structurally secured to one another utilizing gussets 135 and 200 as shown in cross section in FIG. 4. For clarity, latch 175 and bar 190 shown in FIG. 3 restraining the trolley pole 15 in the stowed position are not shown in FIG. 4, where they are inactive.

By utilizing a collar 70 on the pivot support 65 which extends over an imaginary column 130 defined by the cavity 50, it is possible to move the pivot pin 125 very close to the point of contact 95 of the spring 60, thereby minimizing the moment arm A2 at a time when the spring force F2 is a maximum. This may not only be utilized to minimize the force on the trolley pole shoe 30 but furthermore may be utilized to provide an arrangement under which the force required against the shoe 30 to move the trolley pole 15 into the stowed position is less than the force exerted by the shoe 30 against the trolley line 20 when the trolley pole 15 is in the extended position.

What has been described is a trolley pole support apparatus which minimizes the moment arm between the contact point at which the spring force is transmitted to a pivoting member attached to a trolley pole and the point upon which the trolley pole pivots, thereby minimizing the force required against the trolley pole shoe to position the trolley pole in the stowed position.

The embodiments discussed herein are to be considered in all respects as illustrative and not restrictive, and all changes coming within the meaning and equivalency range of the appended claims are intended to be embraced therein.

I claim:

1. An apparatus for supporting on a vehicle a trolley pole pivotable between an extended position in which a shoe on an end of the trolley pole engages an overhead conductor and a retracted position in which the trolley pole is stowed, said apparatus comprising:
   a) a base mounted upon the vehicle having a cavity therein, wherein the cavity has a bottom defined by a floor;
   b) a coil spring supported in the floor of the cavity;
   c) a pivot support pivotally attached on outside of the base and at a position substantially below an upper portion of the base and the pivot support having a collar;
   d) a pivoting member attached to an end of the trolley pole opposite the shoe and pivotally connected about a pivot point in the collar of the pivot support;
   e) a link extending from the pivoting member to a contact point on the coil spring and compressing the coil spring to create a rotational force urging the trolley pole to the extended position;
   f) wherein an imaginary column is defined by an upward projection of the cavity beyond the base;
   g) wherein the linear distance between the pivot point in the collar and the contact point on the coil spring defines a moment arm;
   h) wherein the collar of the pivot support extends into the imaginary column to minimize the linear distance and thereby minimize the moment arm between the pivot point and the contact point on the coil spring when the trolley pole is in the stowed position; and
   i) wherein the collar of the pivot support is movable away from the imaginary column to provide an uninterrupted path for removal of the spring from the cavity.

2. The apparatus according to claim 1 wherein a pin extends through the pivot support and the pivoting member to pivotally connect them.

3. The apparatus according to claim 1 wherein the link is an integral extension of the pivoting member to the coil spring.

4. The apparatus according to claim 3 further including a spring cup mounted over the coil spring and having a flat top upon which the link rests.

5. The apparatus according to claim 4 wherein the link engages the flat top by compression against the top.

6. The apparatus according to claim 5 wherein in the extended position the link contacts the flat top at one point and in the stowed position the link contacts the flat top at a different point.

7. The apparatus according to claim 1 wherein the ratio of the distance between the shoe and the pivot point and the distance between the contact point and the pivot point is between 30:1 and 70:1.

8. The apparatus according to claim 7 wherein the ratio is greater than 40:1.

9. The apparatus according to claim 8 wherein the ratio is about 56:1.

10. The apparatus according to claim 1 wherein the base further includes a sleeve which rotatably rests within the base and wherein the base cavity is within the sleeve.

11. The apparatus according to claim 1 further including a mounting plate fixed to the base and wherein the pivot support is secured to the mounting plate with a restrained rotatable attachment.

12. The apparatus according to claim 11 wherein the restrained rotatable attachment is a rotator pin and a restraining pin extending through the pivot support and the mounting plate such that the restraining pin may be removed and the pivot support rotated about the mounting plate to displace the pivot support collar from the imaginary column.

13. The apparatus according to claim 12 wherein the pins are threaded bolts.

14. The apparatus according to claim 1 wherein the cavity is cylindrical in shape.

15. A vehicle having a trolley pole and an apparatus for supporting the trolley pole, wherein the trolley pole is pivotable between an extended position in which a shoe on the trolley pole engages an overhead conductor and a retracted position in which the trolley pole is stowed, said apparatus comprising:
   a) a base mounted upon the vehicle having a cavity therein, wherein the cavity has a bottom defined by a floor;
   b) a coil spring supported in the floor of the cavity;
   c) a pivot support pivotally attached on outside of the base and at a position substantially below an upper portion of the base and the pivot support having a collar;
   d) a pivoting member attached to an end of the trolley pole opposite the shoe and pivotally connected about a pivot point in the collar of the pivot support;
   e) a link extending from the pivoting member to a contact point on the coil spring and compressing the coil spring to create a rotational force urging the trolley pole to the extended position;
   f) wherein an imaginary column is defined by an upward projection of the cavity beyond the base;
   g) wherein the linear distance between the pivot point in the collar and the contact point on the coil spring defines a moment arm;
   h) wherein the collar of the pivot support extends into the imaginary column to minimize the linear distance and thereby minimize the moment arm between the pivot point and the contact point on the coil spring when the trolley pole is in the stowed position; and
   i) wherein the collar of the pivot support is movable away from the imaginary column to provide an uninterrupted path for removal of the spring from the cavity.

16. An apparatus for supporting on a vehicle a trolley pole pivotable between an extended position in which a shoe on an end of the trolley pole engages an overhead conductor and a retracted position in which the trolley pole is stowed comprising:
   a) a base mounted upon the vehicle having a cavity therein, wherein the cavity has a bottom defined by a floor;
   b) a coil spring supported in the floor of the cavity;
   c) a pivot support pivotally attached on outside of the base and at a position substantially below an upper portion of the base and the pivot support having a collar;
   d) a pivoting member attached to an end of the trolley pole opposite the shoe and pivotally connected about a pivot point in the collar of the pivot support;
   e) a link extending from the pivoting member to a contact point on the coil spring and compressing the coil spring to create a rotational force urging the trolley pole to the extended position;
   f) wherein an imaginary column is defined by an upward projection of the cavity beyond the base;
   g) wherein the linear distance between the pivot point in the collar and the contact point on the coil spring defines a moment arm;

h) wherein the collar of the pivot support extends into the imaginary column to minimize the linear distance and thereby minimize the moment arm between the pivot point and the contact point on the coil spring when the trolley pole is in the stowed position;

i) wherein the link is an extension of the pivoting member and communicates with the coil spring; and j) wherein the collar of the pivot support is movable away from the imaginary column to provide an uninterrupted path for removal of the spring from the cavity.

17. The apparatus according to claim 16 further including a spring cup mounted over the coil spring and having a flat top upon which the link rests.

18. The apparatus according to claim 17 wherein the link engages the flat top by compression against the top.

19. The apparatus according to claim 18 wherein in the extended position the link contacts the flat top at one point and in the stowed position the link contacts the flat top at a different point.

20. The apparatus according to claim 16 wherein the ratio of the distance between the shoe and the pivot point and the distance between the contact point and the pivot point is between 30:1 and 70:1.

21. An apparatus for supporting on a vehicle a trolley pole pivotable between an extended position in which a shoe on an end of the trolley pole engages an overhead conductor and a retracted position in which the trolley pole is stowed, said apparatus comprising:

a) a base mounted upon the vehicle having a cavity therein, wherein the cavity has a bottom defined by a floor;

b) a coil spring supported in the floor of the cavity;

c) a pivot support attached to the base and having a collar;

d) a pivoting member attached to an end of the trolley pole opposite the shoe and pivotally connected about a pivot point in the collar of the pivot support;

e) a link extending from the pivoting member to a contact point on the coil spring and compressing the coil spring to create a rotational force urging the trolley pole to the extended position;

f) wherein an imaginary column is defined by an upward projection of the cavity beyond the base;

g) wherein the linear distance between the pivot point in the collar and the contact point on the coil spring defines a moment arm;

h) wherein the collar of the pivot support extends into the imaginary column to minimize the linear distance and thereby minimize the moment arm between the pivot point and the contact point on the coil spring when the trolley pole is in the stowed position; and j) wherein the ratio of the distance between the shoe and the pivot point and the distance between the contact point and the pivot point is between 30:1 and 70:1.

* * * * *